June 22, 1926.

N. MILNER

VEHICLE DOOR CONTROL

Filed May 22, 1925

1,589,410

INVENTOR.
NUGENT MILNER.
BY
ATTORNEYS.

Patented June 22, 1926.

1,589,410

UNITED STATES PATENT OFFICE.

NUGENT MILNER, OF EVANSVILLE, INDIANA, ASSIGNOR TO GRAHAM BROTHERS, OF EVANSVILLE, INDIANA, A CORPORATION.

VEHICLE-DOOR CONTROL.

Application filed May 22, 1925. Serial No. 32,051.

This invention relates more particularly to means for controlling and operating the doors of automobile busses, although it is capable of use in other automobiles and vehicles.

One object of the invention is to enable the driver of the vehicle to operate the door control with his left hand without interference with the vehicle control. This leaves the right hand of the bus driver free to operate with safety the levers controlling the bus or automobile.

Another object of the invention is the concealment of the door operating mechanism, at least nearly all of it, which not only gives to the construction of the bus or automobile a better appearance, but also prevents interference with the door control by passengers, especially when the vehicle is crowded, and thus permit the safe exit of passengers, especially in an emergency. Also this new door control makes room for the convenient placing of a fare box or other equipment in the front end of the bus or automobile. In addition to the above is the further object of obtaining a more positive and easier operation of the door control.

Another object of the invention is a door control which is practical and can be connected with the door midway between the top and bottom. This eliminates the binding and twisting of the door which results from connecting the door control with the top or bottom of the door as heretofore.

Figure 1:
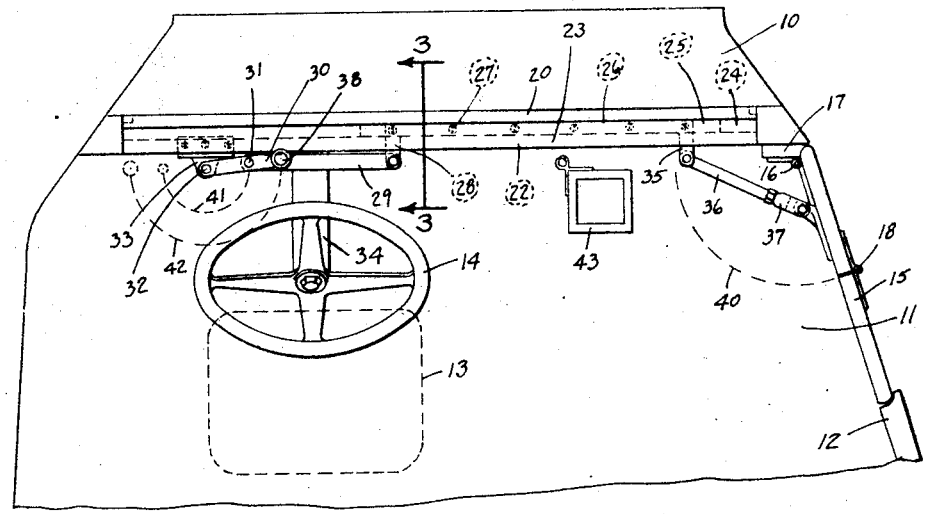
Figure 2:
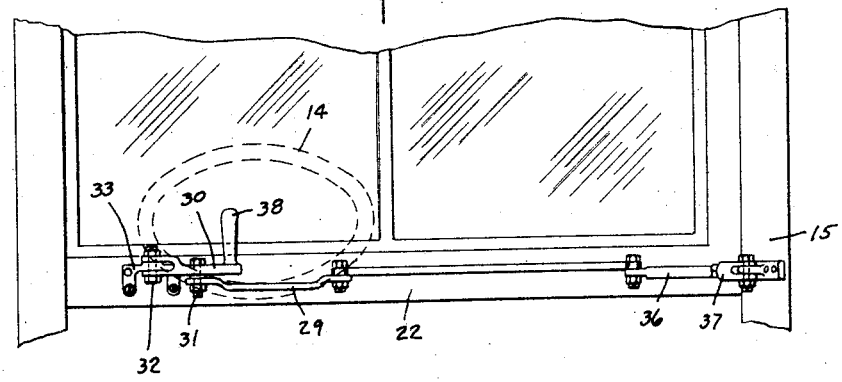
Figure 3:
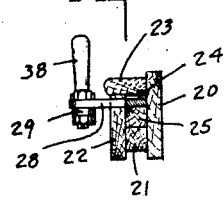

The full nature of the invention will be understood from the accompanying drawings and the following description and claims:

In the drawings, Figure 1 is a plan view of the forward portion of the body of a bus or automobile. Fig. 2 is a front elevation of the mechanism shown in Fig. 1, the upper and lower parts being broken away. Fig. 3 is a vertical section on the line 3—3 of Fig. 1.

The mechanism shown in the drawings illustrates the general nature of the invention and presents parts of an automobile bus, but the invention is not necessarily limited thereto as it could be employed in other constructions and types of automobiles and vehicles. In Fig. 1 there appears a cowl 10 at the front of the body of an automobile, which has a floor 11 and side walls 12. The driver's seat 13, shown by dotted lines in Fig. 1, and the steering wheel 14 are located as usual at the left-hand side, and there is at the right-hand side a door 15 opened and closed by the driver of the vehicle to permit the entrance and exit of passengers. This door is hinged at its front edge by the hinges 16 to a pillar 17 of the body so that the door opens inwardly, and the particular door shown is a double door centrally hinged on the outside at 18 to permit it to fold as it opens so as to be out of the way of the passengers, and, as it closes, it unfolds and becomes transversely straight.

The foregoing parts are old and do not constitute the new features of this invention, as the invention relates to the means operable by the driver, while sitting in the seat and at the wheel at the left hand of the car, to open and close the door at the right-hand side thereof. In the front part of the automobile body there is a frame construction extending transversely of the automobile and preferably at substantially the same elevation as the usual instrument board. This frame, as here shown, consists of a forward board or plate 20 extending transversely of the body of the automobile and to its rear face there is secured a transverse bar or member 21 and to it a dash or member 22, which is spaced from the plate or board 20 for a distance equal to the thickness of the bar or member 21. The horizontal plate or board 23 is secured on top of the dash 22 and is secured to the rear face of the board or member 20, as shown in Fig. 3. This construction of the frame leaves a transversely disposed recess 24 between the members 21 and 23. In this recess there is loosely located a slidable member 25, shown here made of wood, but this and the other parts may be made of metal, if desired. It is longitudinally slidable transversely of the automobile body by means of a metal bar 26 secured thereon by the screws 27. Bar 25 has an arm 28 extending from the lefthand end rearwardly which operates through a transversely extending slot in the dash 22. It is moved by a link 29 pivoted at one end to said arm 28 and at the other end about midway of a hand lever 30 where it is pivoted by a pivot 31. The lever 30 is pivoted at one end by a pin 32 to a bracket 33 secured on the dash 22 and extending rearwardly. This bracket, as well as the lever 30, is located to the left of the steering wheel 14, and the steering wheel shaft 34 so that the same may be easily operated by the left hand of the driver of the automobile.

The metal bar 26, which is secured on the sliding bar or member 25, has at its righthand end an arm 35 extending rearwardly with which a link 36 is pivoted, and said link is connected with a door 15 by an adjusting nut 37.

In Fig. 1 the door is shown in full lines closed and it is opened by moving the sliding bar 25 and associated parts to the left, which will cause the door to move in an arc, as indicated by the dotted line 40. The door is opened by the driver with his left hand grasping the upwardly extending handle 38 of the lever 30 and swinging said lever to the left in the arc indicated by the dotted lines 41 and 42, until the lever 31 is thrown to the left beyond the center so as to hold the door open. A reverse movement of the lever 30 will close the door and the construction is such that the end of the pivot 31 of the link 29 will pass forward beyond the line of the pivot 32 of the lever 30. This will hold the door closed. If desired, the lever 30 may be bifurcated at one end, as shown in Fig. 1, for embracing the plate of the bracket 33 and through which the pivot 32 extends.

With the construction above described, it is noted that the door can be opened or closed by the left hand of the driver so as to leave his right hand free to operate the levers of the automobile or any other thing necessary, while the door is being opened or closed. Also the operating parts are largely concealed from view behind the dash and where the same may not be interfered with by passengers and will permit a fare box 43, shown by dotted line in Fig. 1, or other mechanism to be secured to the dash without interfering with the operation of the door or door-operating means. The action of the mechanism is very easy and also very positive, as the leverage is greatly increased in the wedging effect of the connecting link 36 between the sliding bars 26 and the door 15, and also the wedging effect of the connecting link 29 between the control handle 38 on the lever 30 and the sliding bar 26.

While the foregoing drawings and description give the general idea of the invention, it is to be understood that the construction, design or combination of parts may be changed and improved in details as may prove expedient, without departing from the spirit of this invention or falling outside of the scope of the claims therefor.

By "vehicle control means" as used in the claims, is meant the steering apparatus or other mechanism for operating and controlling the automobile or vehicle.

The invention claimed is:

1. The combination with a vehicle body having a door in its side, a dash in its front end, and vehicle control means located within the body, of a bar mounted in connection with the dash and extending transversely of the front end of the vehicle body and longitudinally movable, a link pivotally connecting one end of said bar with the door, and means pivoted to the dash at the left hand side of the vehicle control means for operating said bar.

2. The combination with a vehicle body having a door in its side, and a dash in its front end, of a frame construction associated with the dash so as to provide a guideway extending transversely of the front end of the vehicle body, a bar longitudinally slidable in the guideway, a link pivotally connected with the door and slidable bar, and means for operating the slidable bar to open and close the door.

3. The combination with a vehicle body having a door in one side, a dash in its front end, and vehicle control means located within the body, of a frame construction with a dash providing a guideway transversely of the front end of the body, a bar longitudinally slidable in the guideway, a link pivotally connected with the door and slidable bar, a hand lever pivoted to the dash at the left-hand side of the vehicle control means, and a link pivotally connected with the hand lever and said slidable bar.

4. In combination with a vehicle body having a door in its side, and a dash in its front end, of a frame construction associated with the dash so as to provide a guideway extending transversely of the front end of the vehicle body, a bar longitudinally slidable in the guideway, a link pivotally connected with the door and slidable bar, a hand lever pivoted to the dash, and a link connecting the hand lever and said slidable bar for operating the latter, the hand lever and associated link being arranged so that the hand lever will move in the arc of a semi-circle in opening and closing the door, and the end of the link pivoted to the hand lever will pass beyond the pivot of the hand lever in each limit of movement, whereby the door control at its limits of movement will hold the door closed and open.

In witness whereof, I have hereunto affixed my signature.

NUGENT MILNER.